United States Patent
Yang et al.

(10) Patent No.: US 9,739,197 B2
(45) Date of Patent: Aug. 22, 2017

(54) METHOD FOR MONITORING A COLD START OF A BRAYTON CYCLE POWER GENERATION SYSTEM

(71) Applicant: METAL INDUSTRIES RESEARCH&DEVELOPMENT CENTRE, Kaohsiung (TW)

(72) Inventors: Sheng-Chung Yang, Kaohsiung (TW); Kou-Cheng Lee, Kaohsiung (TW); Ho-Chung Fu, Kaohsiung (TW)

(73) Assignee: METAL INDUSTRIES RESEARCH&DEVELOPMENT CENTRE, Kaohsiung (TW)

( * ) Notice: Subject to any disclaimer, the term of this patent is extended or adjusted under 35 U.S.C. 154(b) by 487 days.

(21) Appl. No.: 14/575,190

(22) Filed: Dec. 18, 2014

(65) Prior Publication Data

US 2016/0177839 A1 Jun. 23, 2016

(51) Int. Cl.
| | |
|---|---|
| *F02C 7/08* | (2006.01) |
| *F01D 19/00* | (2006.01) |
| *F02C 9/00* | (2006.01) |
| *F02C 1/10* | (2006.01) |

(52) U.S. Cl.
CPC ............... *F02C 7/08* (2013.01); *F01D 19/00* (2013.01); *F02C 1/10* (2013.01); *F02C 9/00* (2013.01); *F05D 2210/10* (2013.01); *F05D 2220/76* (2013.01); *F05D 2260/80* (2013.01); *F05D 2260/85* (2013.01); *F05D 2270/708* (2013.01)

(58) Field of Classification Search
CPC ...... F02C 7/08; F02C 1/04; F02C 1/10; F02C 9/00; F01D 19/00; F05D 2210/10; F05D 2220/76; F05D 2260/80; F05D 2260/85; F05D 2270/708
USPC ......... 60/774, 786, 788, 645, 646, 660, 682, 60/684
See application file for complete search history.

(56) References Cited

U.S. PATENT DOCUMENTS 9,388,817 B1 * 7/2016 Wright .................... F02B 39/10
2013/0033044 A1 2/2013 Wright et al.

* cited by examiner

*Primary Examiner* — Phutthiwat Wongwian
*Assistant Examiner* — Loren Edwards
(74) *Attorney, Agent, or Firm* — WPAT, PC

(57) ABSTRACT

A method for monitoring cold start of Brayton cycle power generation system comprises: measuring an ambient temperature to obtain a Brayton cycle predetermined operating line of a working fluid, parameter values and calculated values of three monitoring points of the Brayton cycle predetermined operating line, and a position of a saturation curve of the working fluid according to the ambient temperature and a LUT; starting the cold start, continuously measuring the parameter values of the three monitoring points, and meanwhile continuously recording and displaying moving trajectories of the parameter values and the calculated values of the three monitoring points; after the parameter values and the calculated values of the three monitoring points are close to the default values, operating the Brayton cycle power generation system for a predetermined time; and ending the cold start, to enter a stable operating state of the Brayton cycle power generation system.

10 Claims, 10 Drawing Sheets

METHOD FOR MONITORING A COLD START OF A BRAYTON CYCLE POWER GENERATION SYSTEM

BACKGROUND

Technical Field

The present invention relates to a method for monitoring a cold start of a Brayton cycle power generation system, and more particularly to a method for monitoring a cold start of a Brayton cycle power generation system that monitors the cold start of the Brayton cycle power generation system by means of intuitive graphic control.

Related Art

On the basis of data of the year 2010 Energy Statistics Manual, about more than 90% of the energy in Taiwan was generated in the form of heat, and nearly 50% thereof was discharged into environments in the form of waste heat. In consideration of effective applications of economics and energy, if improvement of the efficiency of energy use and recovery of waste heat can be made at the same time, energy use will be greatly reduced and the impact on climate warming will also be reduced.

At present, Taiwan has invested waste heat recovery applications in power generation systems, such as a Brayton cycle power generation system taking supercritical carbon dioxide as a working fluid with high efficiency, small size and environmental protection. The US Patent Publication No. US 2013/0033044A1 discloses enhancing power cycle efficiency for a supercritical Brayton cycle power generation system using tunable supercritical gas mixtures. The patent reference uses tunable supercritical gas mixtures, for example, carbon dioxide, alkane or inert gas mixtures, as working fluids of a Brayton cycle power generation system, so as to enhance the power cycle efficiency. The patent reference can be incorporated herein by reference. However, the patent reference does not disclose how to monitor cold start of the Brayton cycle power generation system.

Therefore, it is necessary to provide a method for monitoring a cold start of a Brayton cycle power generation system, which can solve the foregoing problems.

SUMMARY

An objective of the present invention is to provide a method for monitoring a cold start of a Brayton cycle power generation system that monitors the cold start of the Brayton cycle power generation system by means of intuitive graphic control.

To achieve the above-mentioned objective, the present invention provides a method for monitoring a cold start of a Brayton cycle power generation system, the Brayton cycle power generation system comprising a working fluid, the method comprising the following steps: measuring an ambient temperature of the Brayton cycle power generation system, to obtain a Brayton cycle predetermined operating line of the working fluid, initial values and default values of parameter values and calculated values of at least three monitoring points of the Brayton cycle predetermined operating line, and a position of a saturation curve of the working fluid according to the ambient temperature and a look up table (LUT); starting the cold start of the Brayton cycle power generation system, continuously measuring the parameter values of the three monitoring points, and meanwhile continuously recording and displaying moving trajectories of the parameter values and the calculated values of the three monitoring points, wherein the moving trajectories move from the initial values of the parameter values and the calculated values of the three monitoring points to the default values of the parameter values and the calculated values of the three monitoring points; after the parameter values and the calculated values of the three monitoring points are close to the default values, operating the Brayton cycle power generation system for a predetermined time; and after the Brayton cycle power generation system has been operated for the predetermined time, ending the cold start of the Brayton cycle power generation system, to enter a stable operating state of the Brayton cycle power generation system.

In the method for monitoring the cold start of the Brayton cycle power generation system according to the present invention, the cold start of the Brayton cycle power generation system is monitored by means of intuitive graphic control, which can simplify a control process of the cold start, and states of parameter values and calculated values of important monitoring points are confirmed, so as to successfully complete the cold start of the Brayton cycle power generation system.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

In order to make the objective, features and characteristics of the present invention more comprehensible, related embodiments of the present invention are described in detail below with reference to the drawings.

Figure 1A:
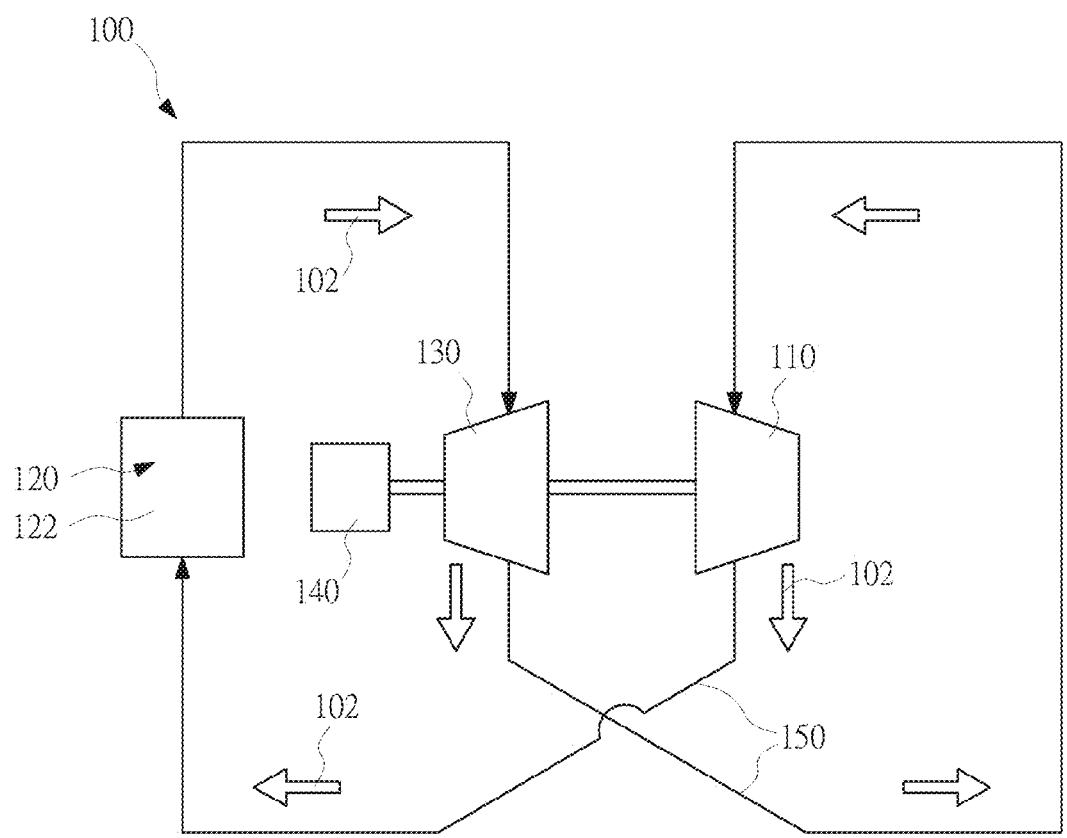
FIG. 1a is a schematic view showing a structure of a Brayton cycle power generation system according to one embodiment of the present invention.
Figure 1B:
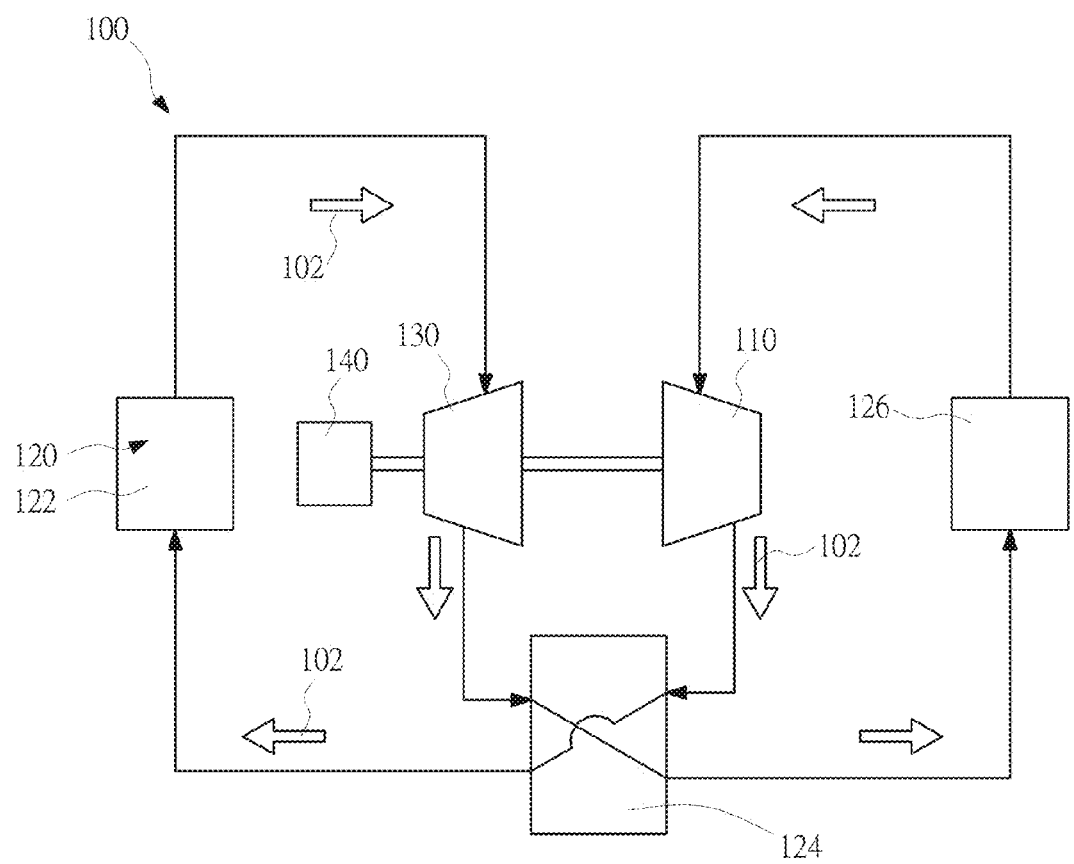
FIG. 1b is a schematic view showing a structure of a Brayton cycle power generation system according to another embodiment of the present invention.

FIG. 1a is a schematic view showing a structure of a Brayton cycle power generation system 100 according to one embodiment of the present invention. The structure of the Brayton cycle power generation system 100 in this embodiment is intended to describe the present invention, but is not intended to limit the present invention. Referring to FIG. 1a, the Brayton cycle power generation system 100 includes a compressor unit 110, a heat exchange unit 120, a turbine unit 130, a power generation unit 140, a piping unit 150 and a working fluid. The turbine unit 130 is mechanically connected to the compressor unit 110, and used for driving the compressor unit 110. The turbine unit 130 is also mechanically connected to the power generation unit 140, and used for driving the power generation unit 140. The compressor unit 110 is used for compressing and pressurizing the working fluid. The heat exchange unit 120 includes a heat-source-side heat exchanger 122, which is used for warming the working fluid. The turbine unit 130 is used for expanding, depressurizing and cooling the working fluid. The piping unit 150 is used for communicating with the compressor unit 110, the heat exchange unit 120 and the turbine unit 130, to enable the working fluid to flow among the compressor unit 110, the heat exchange unit 120 and the turbine unit 130. Referring to FIG. 1b, in another embodiment, the heat exchange unit 120 may further include a recuperative exchanger 124 and a secondary recovery heat exchanger 126, which is used for recovering waste heat discharged by the turbine unit 130.

Referring to FIG. 1a again, the cold start of the Brayton cycle power generation system 100 refers to that the Brayton cycle power generation system 100 is from a shutdown state into a stable operating state. For example, an external starter (not shown) is used to electrically connect to the power generation unit 140, to change the power generation unit 140 into a motor. The motor rotates the turbine unit 130, thereby driving the compressor unit 110. The compressor unit 110 makes the working fluid become a high-pressure supercritical fluid which flows forward (in a direction indicated by an arrow 102). The heat exchange unit 120 continuously heats the working fluid, to make the working fluid become a high-temperature high-pressure supercritical fluid, for example, the heat-source-side heat exchanger 122 of the heat exchange unit 120 may heat the working fluid by using the waste heat in metal melting, thermal treatment, petrochemical and other industrial processes, the heat generated by sunlight radiation, and geothermal energy. The high-temperature high-pressure working fluid enters into the turbine unit 130 to expand, and pushes the turbine unit 130. The turbine unit 130 makes the working fluid become a low-temperature low-pressure supercritical fluid. The low-temperature low-pressure working fluid returns to the compressor unit 110.

If it is measured that a force with which the high-temperature high-pressure working fluid pushes the turbine unit 130 is greater than a force with which the motor drives the turbine unit 130, it indicates that the cold start of the Brayton cycle power generation system 100 breaks through the inertia of the energy barrier of the Brayton cycle power generation system 100. After the Brayton cycle power generation system 100 has been operated for a predetermined time, the Brayton cycle power generation system 100 enters into a stable operating state. At this time, the external starter is turned off, so that the power generation unit 140 becomes a power generator, performs self-loading operation and power generation, and ends the cold start process.

Figure 2:
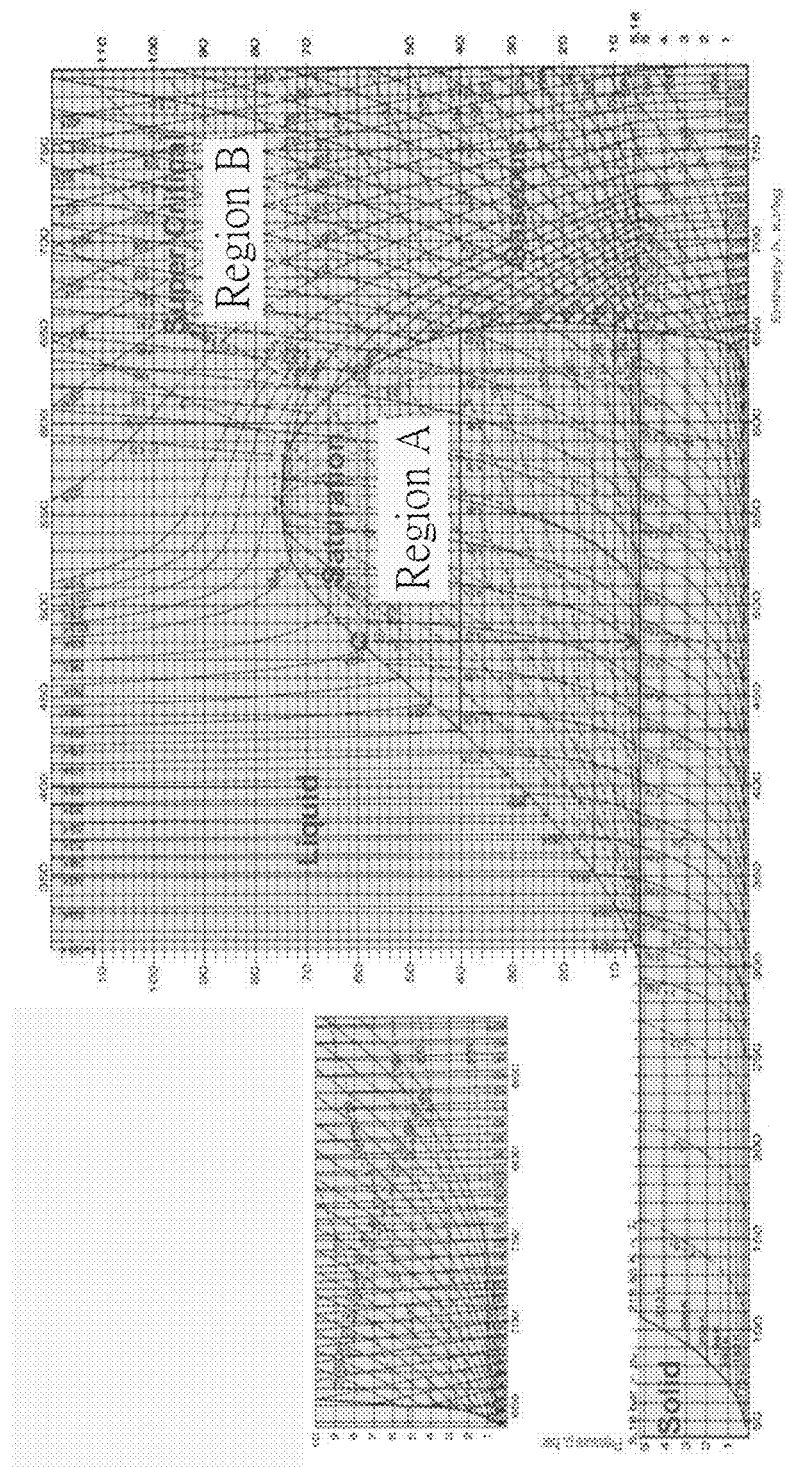
FIG. 2 is a three-phase diagram of carbon dioxide.

FIG. 2 is a three-phase diagram of carbon dioxide. In this embodiment, the working fluid is supercritical carbon dioxide. The cold start of the Brayton cycle power generation system 100 refers to that the Brayton cycle power generation system 100 is from a shutdown state into a stable operating state, that is, the state of the carbon dioxide is from Region A into Region B in FIG. 2. When the Brayton cycle power generation system 100 is in the shutdown state, all parameters of the working fluid, e.g., temperature, pressure, flow, density and the like, and all calculated values, e.g., enthalpy and entropy, are all initial values. When the Brayton cycle power generation system 100 is in the stable operating state, all parameters of the working fluid, e.g., temperature, pressure, flow, density and the like, and all calculated values, e.g., enthalpy and entropy, are all operating values.

Figure 3:
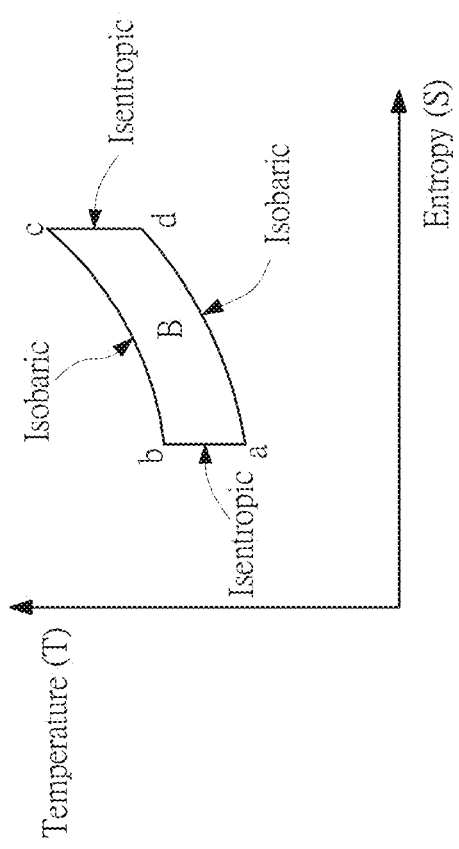
FIG. 3 is a schematic view showing a Brayton cycle ideal operating line of the Brayton cycle power generation system according to one embodiment of the present invention.

FIG. 3 is a schematic view showing a Brayton cycle ideal operating line of the Brayton cycle power generation system 100 according to one embodiment of the present invention. Referring to FIG. 3 and FIG. 1a, the entire Brayton cycle ideal operating line B includes the following four steps. (1) Isentropic compression step (a→b): after the working fluid is sucked into the compressor unit 110, an adiabatic compression step is performed, to increase an intake pressure to a heat exchange pressure. (2) Isobaric heat exchange step (b→c): the heat-source-side heat exchanger 122 heats the working fluid, to change the compressed working fluid into a high-temperature high-pressure supercritical fluid. (3) Isentropic expansion step (c→d): the high-temperature high-pressure working fluid performs the isentropic expansion step in the turbine unit 130, to become a low-temperature low-pressure supercritical fluid. The working fluid does work on the turbine unit 130, to make the turbine unit 130 drive the compressor unit 110 and the power generation unit 140. (4) Isobaric heat removal step (d→a): the low-temperature low-pressure working fluid is discharged back to the compressor unit 110. The supercritical fluid discharged by the turbine unit 130 is still at a relatively high temperature, and waste heat discharged by the turbine unit can be recovered through the recuperative exchanger 124 and the secondary recovery heat exchanger 126, as shown in FIG. 1b.

Figure 4:
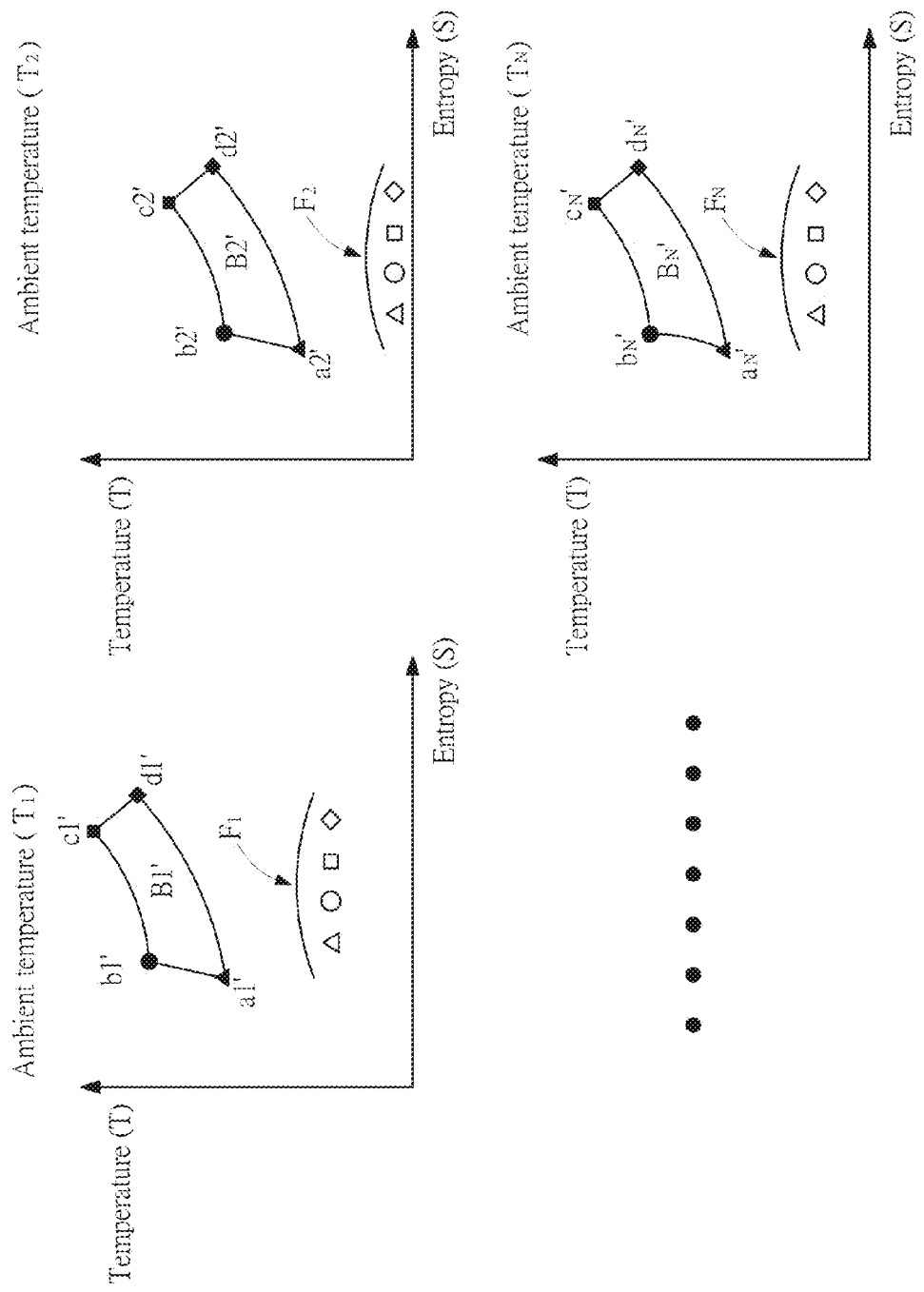
FIG. 4 is a schematic view showing a plurality of ambient temperatures, Brayton cycle real operating lines, and working fluid saturation curves of the Brayton cycle power generation system according to one embodiment of the present invention.
Figure 5:
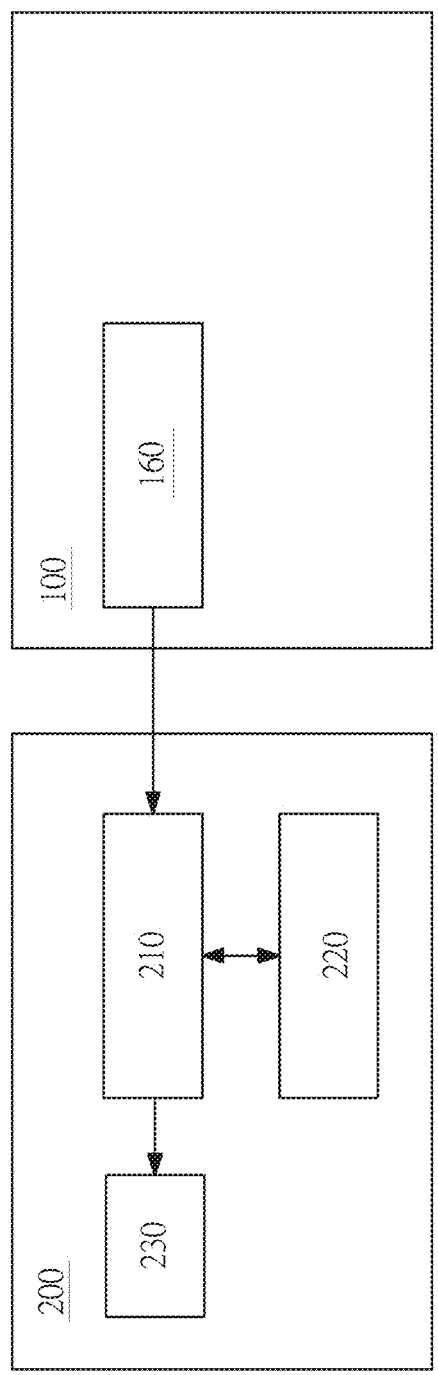
FIG. 5 is a schematic view showing a structure of a Brayton cycle power generation system and a monitoring device according to one embodiment of the present invention.

Referring to FIG. 4 and FIG. 5, according to tests on multiple times of cold start (from a shutdown state into a stable operating state) of the Brayton cycle power generation system 100, under different ambient temperatures of the Brayton cycle power generation system 100, a plurality of sensors 160 is used to measure the ambient temperature and operating values of parameters (for example, temperature, pressure and flow) of the working fluid, and the ambient temperatures, and the operating values are transmitted to a processor 210 (for example, a semiconductor chip) of a monitoring device 200. The processor 210 can obtain through calculation a calculated value (e.g., entropy) and different Brayton cycle real operating lines corresponding to the stable operating state, and the Brayton cycle real operating lines can be designed for the Brayton cycle predetermined operating lines, so as to establish a look up table (LUT). In other words, the LUT stores that a plurality of ambient temperatures respectively corresponds to a plurality of Brayton cycle predetermined operating lines. The LUT can be stored in a memory 220 of the monitoring device 200.

For example, a first ambient temperature $T_1$ corresponds to a first Brayton cycle real operating line $B_1'$ ($a_1' \rightarrow b_1' \rightarrow c_1' \rightarrow d_1' \rightarrow a_1'$) of the Brayton cycle power generation system 100, a second ambient temperature $T_2$ corresponds to a second Brayton cycle real operating line $B_2'$ ($a_2' \rightarrow b_2' \rightarrow c_2' \rightarrow d_2' \rightarrow a_2'$) of the Brayton cycle power generation system, . . . , and an $N^{th}$ ambient temperature $T_N$ corresponds to an $N^{th}$ Brayton cycle real operating line $B_N'$ ($a_N' \to b_N' \to c_N' \to d_N' \to a_N'$) of the Brayton cycle power generation system, as shown in FIG. 4. The N Brayton cycle real operating lines can serve as N Brayton cycle predetermined operating lines of the LUT, so that the LUT stores that N ambient temperatures respectively correspond to N Brayton cycle predetermined operating lines, where N is a positive integer.

The LUT also stores that each Brayton cycle predetermined operating line has a group of monitoring points, each group of monitoring points have a plurality of monitoring points (for example, the first group of monitoring points have monitoring points $a_1'$, $b_1'$, $c_1'$, and $d_1'$, the second group of monitoring points have monitoring points $a_2'$, $b_2'$, $c_2'$, and $d_2'$, . . . , the N-th group of monitoring points have monitoring points $a_N'$, $b_N'$, $c_N'$, and $d_N'$), and parameter values and calculated values (e.g., temperature value and entropy) of the monitoring points have initial values (e.g., hollow triangle, circle, square and diamond in FIG. 4) and default values (e.g., solid triangle, circle, square and diamond in FIG. 4). For example, positions of the monitoring points $a_N'$, $b_N'$, $c_N'$, and $d_N'$ in the N-th group of monitoring points can be an inlet of the compressor unit 110, an outlet of the compressor unit 110, an inlet of the turbine unit 130, and an outlet of the turbine unit 130, as shown in FIG. 1a. The three monitoring points $a_N'$, $b_N'$, and $c_N'$ are primary monitoring points, and their positions are respectively the inlet of the compressor unit 110, the outlet of the compressor unit 110, and the inlet of the turbine unit 130, to serve as first to third monitoring points. The monitoring point $d_N'$ is a secondary monitoring point, and its position is the outlet of the turbine unit 130, to serve as a fourth monitoring point.

The LUT also stores that a plurality of ambient temperatures ($T_1, T_2, \ldots, T_N$) of the Brayton cycle power generation system respectively correspond to positions of a plurality of saturation curves ($F_1, F_2, \ldots, F_N$) of the working fluid, as shown in FIG. 4.

Figure 6:
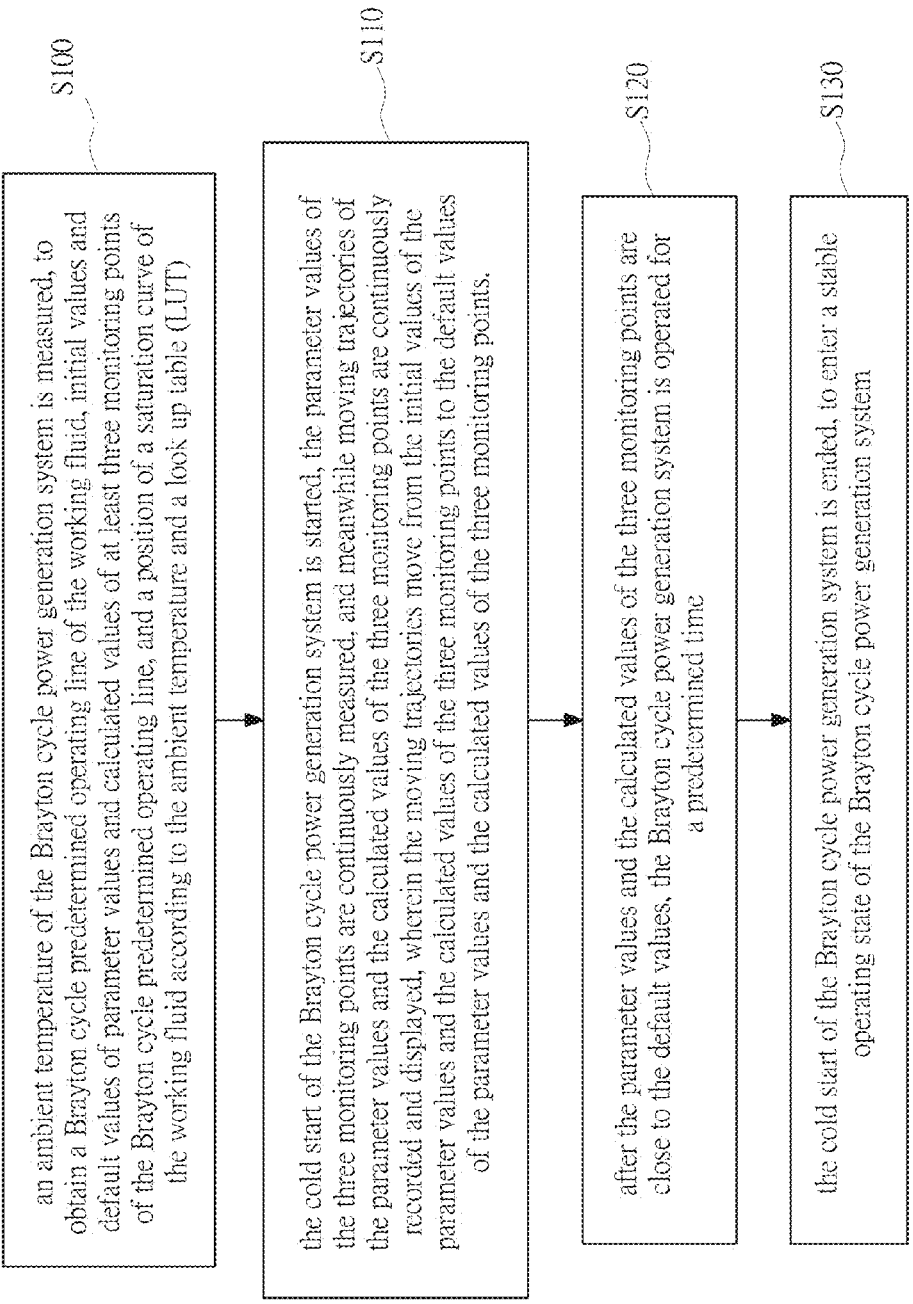
FIG. 6 is a flow diagram of a method for monitoring cold start of a Brayton cycle power generation system according to one embodiment of the present invention.

FIG. 6 is a flow diagram of a method for monitoring a cold start of a Brayton cycle power generation system according to one embodiment of the present invention. The Brayton cycle power generation system includes a working fluid, and the working fluid is supercritical carbon dioxide. The monitoring method includes the following steps.

Figure 7:
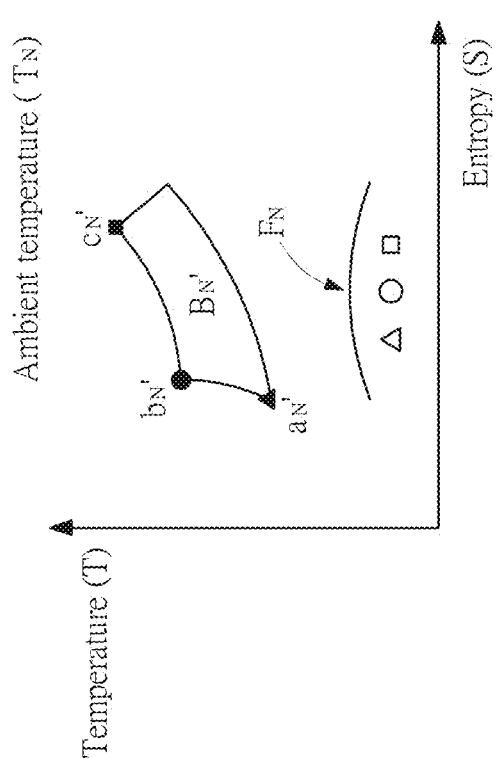
FIG. 7 is a schematic view showing an $N^{th}$ ambient temperature, Brayton cycle real operating line, and working fluid saturation curve of a Brayton cycle power generation system according to one embodiment of the present invention, which displays the state of step S100.

In step S100, an ambient temperature of the Brayton cycle power generation system is measured, to obtain a Brayton cycle predetermined operating line of the working fluid, initial values and default values of parameter values and calculated values of at least three monitoring points of the Brayton cycle predetermined operating line, and a position of a saturation curve of the working fluid according to the ambient temperature and a LUT. For example, referring to FIG. 5 again, the Brayton cycle power generation system 100 can use sensors 160 to measure the ambient temperature $T_N$, and transmit the ambient temperature $T_N$ to the processor 210 of the monitoring device 200. The processor 210 can obtain a Brayton cycle predetermined operating line of the working fluid, initial values (hollow triangle, circle and square in FIG. 7) and default values (solid triangle, circle and square in FIG. 7) of parameter values and calculated values of at least three monitoring points $a_N'$, $b_N'$, and $c_N'$ of the Brayton cycle predetermined operating line $B_N'$, and a position of a saturation curve $F_N$ of the working fluid according to the ambient temperature $T_N$ and the LUT of the memory 220, as shown in FIG. 7. In this embodiment, the parameter values and calculated values of the monitoring points $a_N'$, $b_N'$, and $c_N'$ are temperature values and entropy respectively.

In step S110, the cold start of the Brayton cycle power generation system is started, the parameter values of the three monitoring points are continuously measured, and meanwhile moving trajectories of the parameter values and the calculated values of the three monitoring points are continuously recorded and displayed, wherein the moving trajectories move from the initial values of the parameter values and the calculated values of the three monitoring points to the default values of the parameter values and the calculated values of the three monitoring points.

For example, referring to FIG. 1a again, the cold start of the Brayton cycle power generation system is started by using an external starter (not shown) to electrically connect to the power generation unit 140, to change the power generation unit 140 into a motor. The motor rotates the turbine unit 130, thereby driving the compressor unit 110. The compressor unit 110 makes the working fluid become a high-pressure supercritical fluid. The heat exchange unit 120 continuously heats the working fluid, to make the working fluid become a high-temperature high-pressure supercritical fluid. The high-temperature high-pressure working fluid enters into the turbine unit 130 to expand, and pushes the turbine unit 130. The turbine unit 130 makes the working fluid become a low-temperature low-pressure supercritical fluid. The low-temperature low-pressure working fluid returns to the compressor unit 110.

Figure 8:
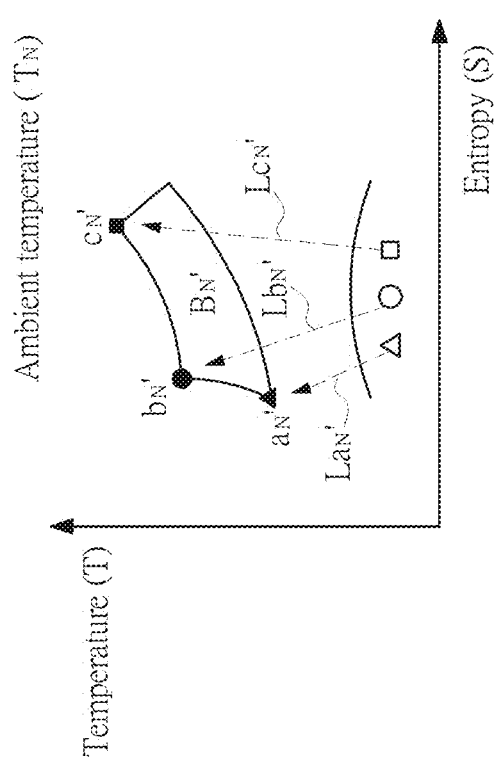
FIG. 8 is a schematic view showing an $N^{th}$ ambient temperature, Brayton cycle real operating line, and working fluid saturation curve of a Brayton cycle power generation system according to one embodiment of the present invention, which displays the state of step S110.

For example, referring to FIG. 5 again, the Brayton cycle power generation system 100 can use the sensors 160 to continuously measure temperatures, pressures and flows of the three monitoring points $a_N'$, $b_N'$, and $c_N'$, and transmit the temperature values, pressure values and flow values to the processor 210 of the monitoring device 200. The processor 120 calculates entropy, meanwhile continues recording, and displays moving trajectories $La_N'$, $Lb_N'$, and $Lc_N'$ of the temperature values and entropy of the three monitoring points $a_N'$, $b_N'$, and $c_N'$ on a display 230 of the monitoring device 200. The cold start of the Brayton cycle power generation system 100 can be monitored on the display 230 through the moving trajectories $La_N'$, $Lb_N'$, and $Lc_N'$ by means of graphic control, as shown in FIG. 8.

Figure 9:
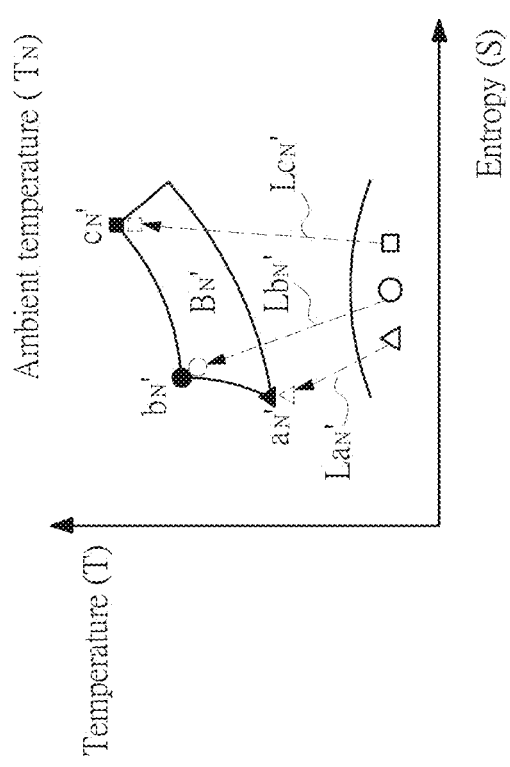
FIG. 9 is a schematic view showing an $N^{th}$ ambient temperature, Brayton cycle real operating line, and working fluid saturation curve of a Brayton cycle power generation system according to one embodiment of the present invention, which displays the state of step S120.

In step S120, after the parameter values and the calculated values of the three monitoring points are close to the default values, the Brayton cycle power generation system is operated for a predetermined time. Referring to FIG. 9, the parameter values and the calculated values close to the default values are operating values (dashed-line hollow triangle, circle and square in FIG. 9), and that the operating values are close to the default values means: error values between the operating values and the default values are within 5%. The predetermined time may be 15 minutes. For example, referring to FIG. 1a again, when the parameter values and the calculated values of the three monitoring points are close to the default values, it indicates that a force with which the high-temperature high-pressure working fluid pushes the turbine unit 130 is greater than a force with which the motor drives the turbine unit 130, that is, the cold start of the Brayton cycle power generation system 100 breaks through the inertia of the energy barrier of the Brayton cycle power generation system 100.

In step S130, the cold start of the Brayton cycle power generation system is ended, to enter a stable operating state of the Brayton cycle power generation system. For example, referring to FIG. 1a again, after the Brayton cycle power generation system 100 has been operated for the predetermined time, the Brayton cycle power generation system 100 enters a stable operating state. At this time, the external starter is turned off, so that the power generation unit 140 becomes a power generator, performs self-loading operation and power generation, and ends the cold start program.

The method for monitoring the cold start of the Brayton cycle power generation system according to the present invention has the following characteristics. (1) The Brayton cycle power generation system needs a stable heat source (via the heat-source-side heat exchanger) to continuously heat the working fluid. (2) A time point when the inertia of the energy barrier of the Brayton cycle power generation system is broken through (that is, the time point when the parameter values and the calculated values of the three monitoring points are close to the default values) can be determined, and then the system can operate stably, so as to avoid that the working fluid becomes stagnant or changes from a forward direction to a reverse direction. (3) It is necessary to monitor states of parameter values and calculated values of at least three monitoring points of the Brayton cycle predetermined operating line of the working fluid in the Brayton cycle power generation system.

In the method for monitoring the cold start of the Brayton cycle power generation system according to the present invention, the cold start of the Brayton cycle power generation system is monitored by means of intuitive graphic control, which can simplify a control process of the cold start, and states of parameter values and calculated values of important monitoring points are confirmed, so as to successfully complete the cold start of the Brayton cycle power generation system.

In conclusion, the above descriptions are merely preferred implementation manners or embodiments of the technical means used in the present invention for solving the problem, but are not to limit the scope of implementation of the present invention. Equivalent variations and modifications consistent with the literal meaning of the claims of the present invention or made according to the scope of the present invention should fall within the scope of the present invention.

What is claimed is:

1. A method for monitoring a cold start of a Brayton cycle power generation system, the Brayton cycle power generation system comprising a working fluid, the method comprising the following steps:

measuring an ambient temperature of the Brayton cycle power generation system, to obtain a Brayton cycle predetermined operating line of the working fluid, initial values and default values of parameter values and calculated values of at least three monitoring points of the Brayton cycle predetermined operating line, and a position of a saturation curve of the working fluid according to the ambient temperature and a look up table (LUT);

starting the cold start of the Brayton cycle power generation system, continuously measuring the parameter values of the three monitoring points, and meanwhile continuously recording and displaying moving trajectories of the parameter values and the calculated values of the three monitoring points, wherein the moving trajectories move from the initial values of the parameter values and the calculated values of the three monitoring points to the default values of the parameter values and the calculated values of the three monitoring points;

after the parameter values and the calculated values of the three monitoring points are close to the default values, operating the Brayton cycle power generation system for a predetermined time; and after the Brayton cycle power generation system has been operated for the predetermined time, ending the cold start of the Brayton cycle power generation system, to enter a stable operating state of the Brayton cycle power generation system.

2. The method for monitoring a cold start of a Brayton cycle power generation system according to claim 1, wherein the cold start of the Brayton cycle power generation system is monitored through the moving trajectory by means of graphic control.

3. The method for monitoring a cold start of a Brayton cycle power generation system according to claim 1, wherein the LUT stores that a plurality of ambient temperatures respectively corresponds to a plurality of Brayton cycle predetermined operating lines.

4. The method for monitoring a cold start of a Brayton cycle power generation system according to claim 3, wherein the LUT also stores that each Brayton cycle predetermined operating line has a group of monitoring points, each group of monitoring points have a plurality of monitoring points, and parameter values and calculated values of the monitoring points have initial values and default values.

5. The method for monitoring a cold start of a Brayton cycle power generation system according to claim 4, wherein the parameter values and calculated values of the monitoring points are respectively temperature values and entropy.

6. The method for monitoring a cold start of a Brayton cycle power generation system according to claim 4, wherein the Brayton cycle power generation system further comprises a compressor unit, a heat exchange unit, a turbine unit, a power generation unit and a piping unit, the turbine unit is mechanically connected to the compressor unit and used for driving the compressor unit, the turbine unit is also mechanically connected to the power generation unit and used for driving the power generation unit, the compressor unit is used for compressing and pressurizing the working fluid, the heat exchange unit comprises a heat-source-side heat exchanger used for warming the working fluid, the turbine unit is used for expanding, depressurizing and cooling the working fluid, and the piping unit is used for communicating with the compressor unit, the heat exchange unit and the turbine unit, to enable the working fluid to flow among the compressor unit, the heat exchange unit and the turbine unit.

7. The method for monitoring a cold start of a Brayton cycle power generation system according to claim 6, wherein the three monitoring points are primary monitoring points, whose positions are an inlet of the compressor unit, an outlet of the compressor unit and an inlet of the turbine unit.

8. The method for monitoring a cold start of a Brayton cycle power generation system according to claim 1, wherein the LUT also stores that a plurality of ambient temperatures of the Brayton cycle power generation system respectively corresponds to positions of a plurality of saturation curves of the working fluid.

9. The method for monitoring a cold start of a Brayton cycle power generation system according to claim 1, wherein the working fluid is supercritical carbon dioxide.

10. The method for monitoring a cold start of a Brayton cycle power generation system according to claim 1, wherein the step of operating the Brayton cycle power generation system for a predetermined time is performed after the parameter values and the calculated values of the three monitoring points are within 5% of the default values.

* * * * *